United States Patent [19]

Gaines

[11] Patent Number: 4,898,255
[45] Date of Patent: Feb. 6, 1990

[54] PLANAR LOAD CELL
[75] Inventor: Ronald J. Gaines, Columbus, Ohio
[73] Assignee: Toledo Scale Corporation, Worthington, Ohio
[21] Appl. No.: 297,176
[22] Filed: Jan. 17, 1989
[51] Int. Cl.$^4$ ............... G01G 3/14; G01G 3/08; G01L 1/22
[52] U.S. Cl. ................. 177/211; 177/229; 73/862.65
[58] Field of Search .............. 177/211, 229; 73/862.65

[56] References Cited

U.S. PATENT DOCUMENTS

| | | |
|---|---|---|
| 4,261,429 | 4/1981 | Lockery . |
| 4,565,255 | 1/1986 | Sarrazin .................. 177/211 |
| 4,577,709 | 3/1986 | Shibahara et al. ......... 177/211 |
| 4,600,066 | 7/1986 | Griffen et al. . |
| 4,600,067 | 7/1986 | Artigue et al. ........... 177/211 |

FOREIGN PATENT DOCUMENTS 124769 9/1979 Japan .

Primary Examiner—George H. Miller, Jr.

[57] ABSTRACT

A load cell stamped from a single plate includes a pair of strain gauges mounted on each lateral edge of the plate and a slot extending between laterally opposite strain gauges. The load cell so formed can be widened to provide increased torsional stiffness and resistance to off-center loading while providing good load cell performance in all other respects. In a low profile scale including the load cell, one longitudinal end of the load cell is connected to a load receiving element and the other fixed to a base plate and ground.

8 Claims, 3 Drawing Sheets

PLANAR LOAD CELL

BACKGROUND OF THE INVENTION

This invention relates to weighing apparatus employing load cells a a transducer element and more particularly to a low profile weighing apparatus employing a load cell of planar form resistant to torsional forces produced by off-center loading.

Many weighing scales now in use employ moment insensitive load cells. One commonly used is the dual beam load cell which includes a pair of parallel beams connected together at each end and having strain gages mounted on each beam. The dual beam load cell provides good resistance to off-center loading and can be compensated to improve performance in that respect. Disadvantages are its high profile, expensive machining and the labor involved in providing strain gages on more than one surface.

The use of single beam load cells has usually required expensive flexures and overload stops which make the structure expensive to machine and result in a high profile scale. The single beam load cell has not been used extensively without flexures because of the large compliance or lack of resistance to torsion in the transverse direction and, to a slightly lesser extent, in the longitudinal direction. Single beam load cells have usually been employed with strain gages aligned on the central longitudinal axis of the beam.

SUMMARY OF THE INVENTION

The present invention provides a low profile weighing apparatus utilizing a single beam load cell without flexures which can provide substantially increased stiffness or resistance to torsion in the transverse direction.

A load cell according to the present invention includes a beam or plate having strain gages mounted on opposite lateral edges of the plate and a slot or opening in the plate extending between laterally opposite strain gages. The load cell is thus "planar" in form. It may be dimensioned in the lateral direction to provide much better resistance to torsional forces than known single beam load cells while functioning well as a load cell in other respects.

The planar load cell of this invention may be stamped from a single plate and for that reason is inexpensive and enables construction of a very low profile scale. Increasing the lateral dimension of the load cell increases the torsional stiffness and reduces the deflection of a scale platter under laterally offset loads. All strain gages can be mounted on the same surface of the plate, reducing the labor and expense involved in mounting them. Also, the strain gages are much more available and convenient for interconnection than in a typical load cell resulting in lower labor costs.

DESCRIPTION OF A PREFERRED EMBODIMENT

Figure 1:
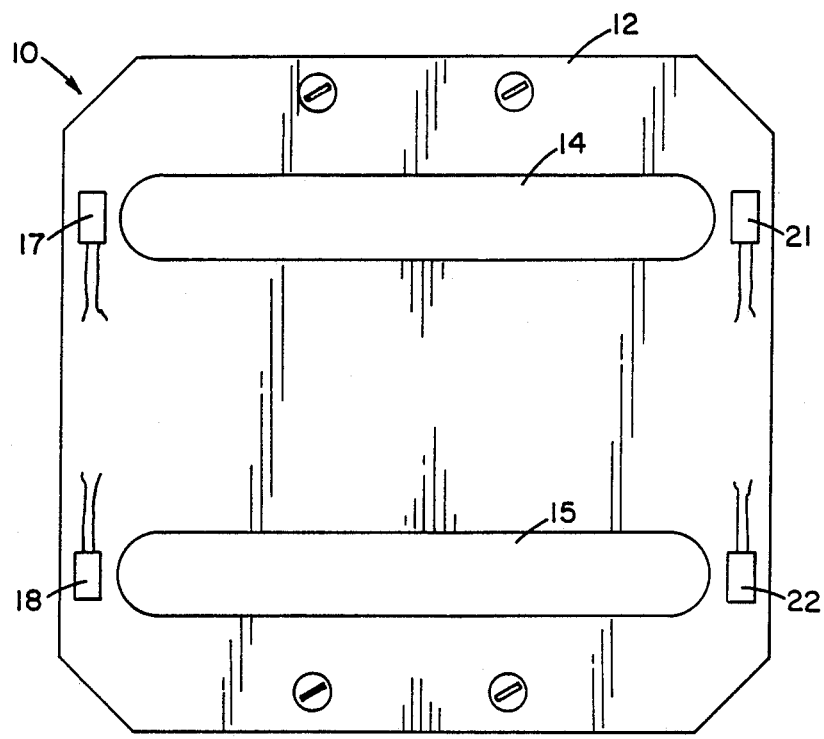
FIG. 1 is a top plan view of a load cell embodying the present invention.

Referring initially to FIG. 1, a load cell 10 embodying the present invention includes a counterforce plate 12 stamped from a single piece of aluminum or other suitable material and having pair of laterally extending slots 14, 15. A first pair of strain gauges 17, 18 is mounted adjacent one lateral edge of plate 12 and aligned longitudinally. Similarly, a second pair of strain gauges 21, 22 is aligned longitudinally adjacent the opposite lateral edge of plate 12. Each strain gauge 17, 18 and 21, 22 is positioned between a lateral edge of plate 12 and the outer end of a slot 14, 15. The strain gauges are thus in areas of strain concentration when a load is applied to the load cell. In use, the strain gauges 17, 18 and 21, 22 will be connected in a bridge circuit to provide an output signal proportional to the load applied to the load cell.

Figure 2:
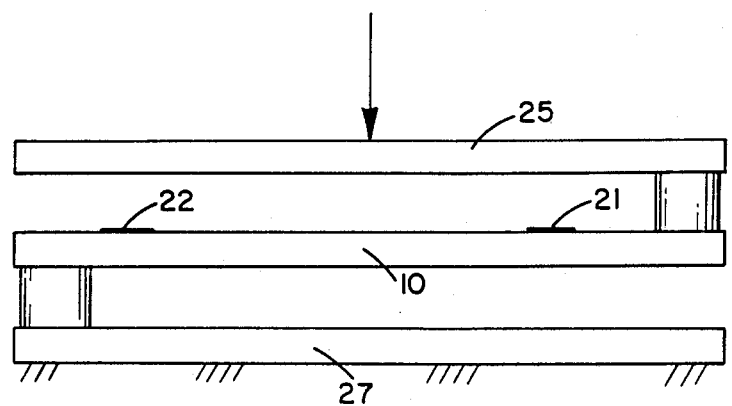
FIG. 2 is a diagram showing the load cell of FIG. 1 connected for operation.

As shown in FIG. 2, load cell 10 is, in use, rigidly connected at one longitudinal end to a load receiving element 25 and at the other longitudinal end to a base plate 27 which is connected to ground. A force applied to load receiving element 25 is transmitted to load cell 10 and causes it to flex so that the strain gauges provide a signal proportional to the force applied. The load receiving element 25, load cell 10 and base plate 27 may be physically arranged in a variety of ways and obtain a satisfactory result so long as load cell 10 is connected at one longitudinal end to load receiving element 25 and at the other longitudinal end to base plate 27.

In FIG. 2, load cell 10 behaves substantially as would a conventional single beam load cell in which the strain gauges are aligned on the central longitudinal axis of the beam. Load cell 10 of this invention, however, employs strain gauges positioned on opposite lateral edges of the beam and a slot extending laterally between opposite strain gauges. This arrangement permits the beam to be widened to increase its torsional stiffness (and, thus, resistance to off-center loading) while the load cell functions well in all other respects.

The lateral dimension or width of load cell 10 may be chosen to provide the degree of torsional stiffness desired. More particularly, the longitudinal and lateral dimensions of plate 12 may be chosen to provide the desired directional stiffness for the scale. In the load cell of FIG. 1, the longitudinal and lateral dimensions of plate 12 are shown as approximately the same but this will not always be the case. In a typical design, the longitudinal dimension of the plate is determined by the size of the weight receiving platter of the proposed scale and the lateral dimension is chosen to provide the desired torsional stiffness. The load cell of FIG. 1 is shown as having two slots between the strain gauges on opposite lateral edges of the plate. However, the advantages of the invention can be obtained with only a single larger slot or opening or several small openings.

Figure 3:
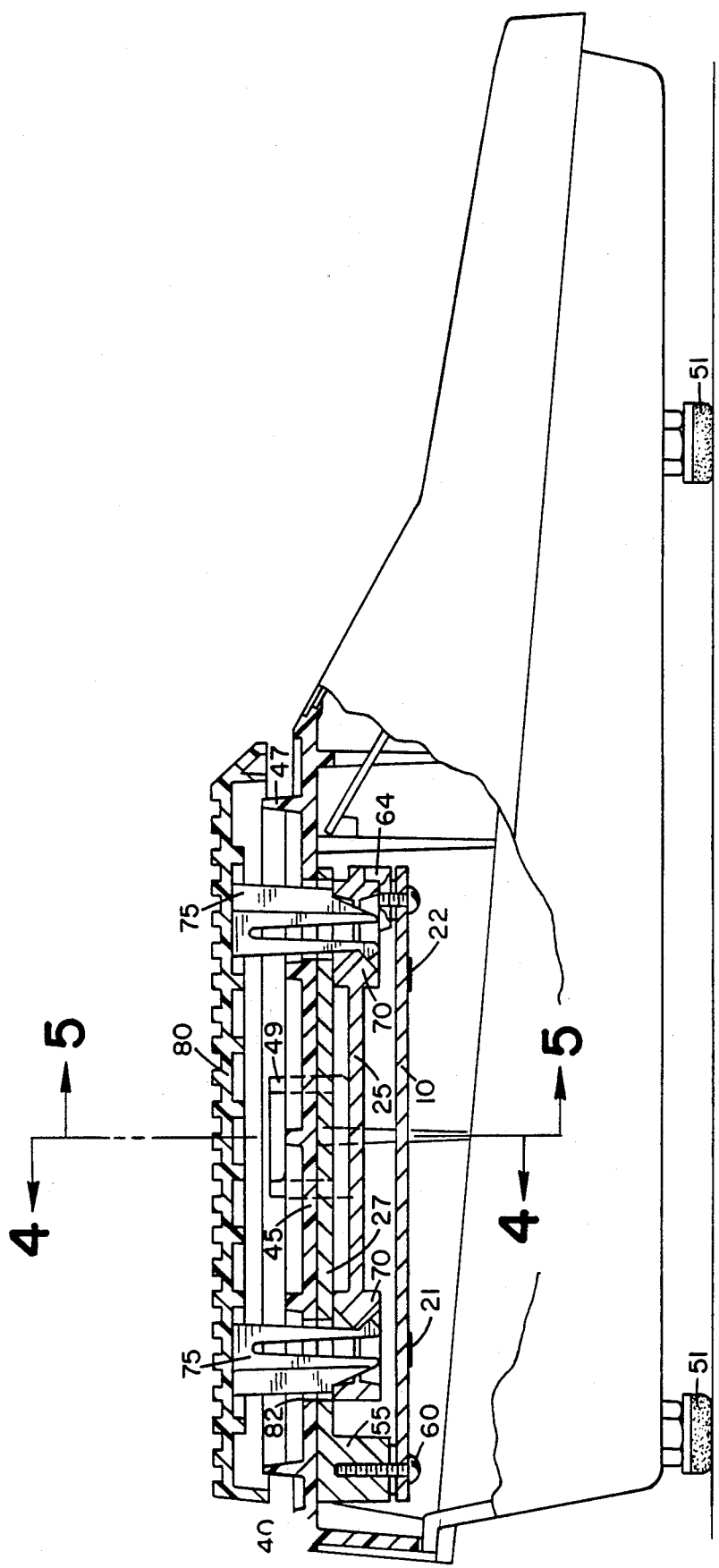
FIG. 3 is a vertical sectional view of a weighing scale embodying the present invention.
Figure 4:
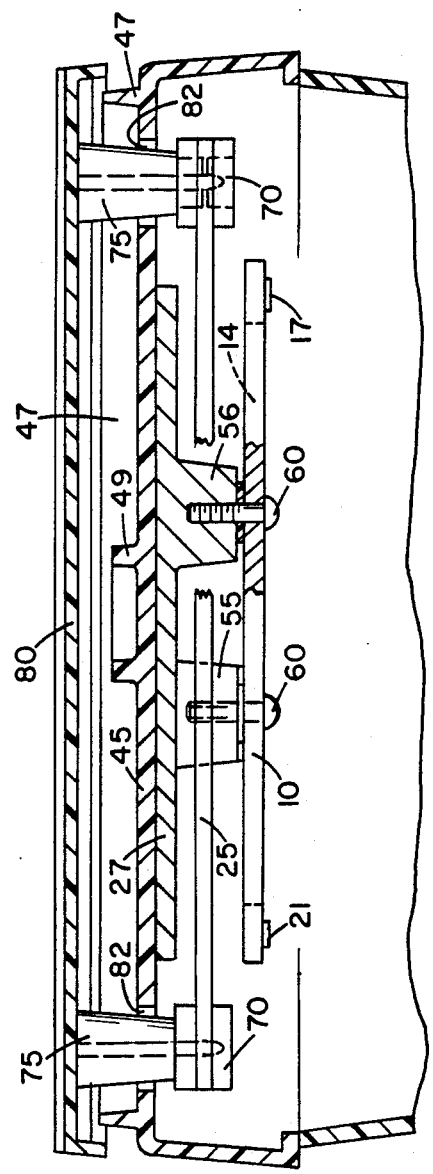
FIG. 4 is a sectional view of the scale of FIG. 3 on the line 4—4.
Figure 5:
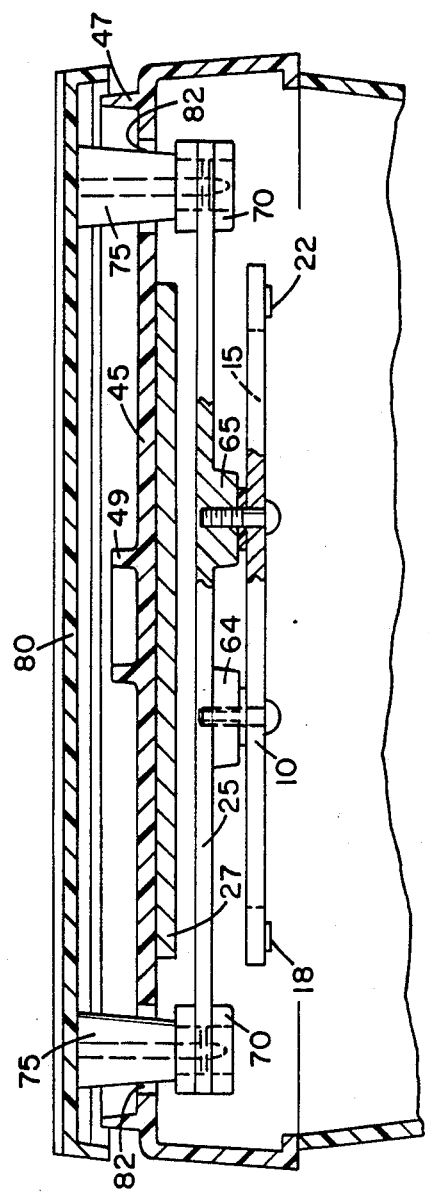
FIG. 5 is a sectional view of the scale of FIG. 3 on the line 5—5.

Referring now to FIGS. 3 to 5, a weighing scale embodying the present invention includes load cell 10, load receiving element, or subplatter, 25 and base plate 27 arranged within a scale housing 40. Strain gages 17, 18 and 21, 22 are mounted on the bottom of load cell 10 for easier access. Housing 40 includes a molded plastic cover 45 having a vertical rim 47 and central cylinder 49. Rim 47 and cylinder 49 serve as overload stops for the scale as will be explained below. Cover 45 is connected through housing 40 and scale feet 51 to a ground surface supporting the scale. Base plate 27 is connected directly to cover 45 by any suitable means such as heat swaging. A pair of spacers 55, 56 are cast integrally with base plate 27 at one longitudinal end thereof. One end, the "fixed" end, of load cell 10 is connected to base plate 27 by means of screws 60 passing through load cell 10 and into spacers 55, 56.

Subplatter, or load receiving element, 25 is positioned vertically between load cell 10 and base plate 27. Spacers 64, 65 are cast integrally with subplatter 25 at one end thereof. The "free" end of load cell 10 (not fixed to base plate 27) is fastened to subplatter 25 by means of screws passing through the load cell and into spacers 64, 65. Subplatter 25 is also provided with four grommet holders 70, two at each longitudinal end. Each grommet holder 70 receives the end of a spring clip 75. Four of such spring clips are molded with and extend vertically downwardly from a platter 80 which receives objects to be weighed. Spring clips 75 pass through openings 82 in cover 45 and transmit the weight of an object placed on platter 80 to subplatter 25. The weight is applied to the free end of load cell 10 through spacers 64, 65 causing the load cell to flex and strain gauges 17, 18 and 21, 22 to provide a signal proportional to the weight on platter 80. Platter 80, when no weight is applied thereto, is positioned a predetermined distance above rim 47 and cylinder 49. Should an excessive weight be placed on platter 80, deflection of subplatter 25 and load cell 10 will be limited by contact between the bottom portion of platter 80 and rim 47 or cylinder 49.

In prior scales employing conventional single beam load cells positioning of the same object at different locations on the platter would produce different degrees of deflection of the load cell. In particular, torsional deflection produced by laterally offset loads was excessive. In a scale according to this invention, however, increased width of the load cell provides greater torsional stiffness and reduced deflection of load cell 10 for laterally offset positions of a load on platter 80.

Another advantage is that, since load cell 10 can be torsionally stiff and require no flexures, a scale according to this invention provides a very low profile.

Finally, placement of all strain gauges on the same surface of the load cell provides easier access for wiring and considerable saving in labor.

What is claimed is:

1. Weighing apparatus comprising a plate having longitudinal and lateral axes and a lateral dimension providing a desired torsional stiffness, a pair of strain gauges mounted adjacent each lateral edge of the plate, the strain gauges of each pair being spaced apart and aligned longitudinally, and slots in the plate extending laterally between the strain gauges of each laterally opposite pair, said slots forming areas of stress concentration in the plate adjacent the strain gauges.

2. Weighing apparatus as claimed in claim 1 wherein said plate includes upper and lower surfaces and all of said strain gauges are mounted on the same surface of the plate.

3. Weighing apparatus as claimed in claim 1 including a base plate rigidly connected to and fixing one end of said plate, said base plate extending substantially parallel to said plate.

4. Weighing apparatus as claimed in claim 1 including load receiving means connected to one end of said plate.

5. Weighing apparatus comprising a plate having longitudinal and lateral axes, a pair of strain gauges mounted adjacent both opposite lateral edges of the plate, slots extending between respective pairs of laterally opposite strain gauges, a base plate connected rigidly to and fixing one longitudinal end of said plate, and load receiving means connected to the other longitudinal end of said plate.

6. Weighing apparatus as claimed in claim 5 including overload stop means for limiting the deflection of said plate.

7. Weighing apparatus as claimed in claim 5 wherein said plate has upper and lower surfaces and all of said strain gauges are mounted on the same surface of the plate.

8. A method of constructing a single beam load cell to have increased resistance to torsional loads, comprising the steps of providing a plate having a longitudinal and a lateral axis and a lateral dimension corresponding to the desired resistance to torsional loads, mounting a pair of strain gauges adjacent each lateral edge of the plate so that the strain gauges of each pair are spaced apart and aligned longitudinally, and forming slots in the plate extending laterally between the strain gauges of each laterally opposite pair to form areas of stress concentration adjacent the strain gauges.

* * * * *